United States Patent Office 2,922,606
Patented Jan. 26, 1960

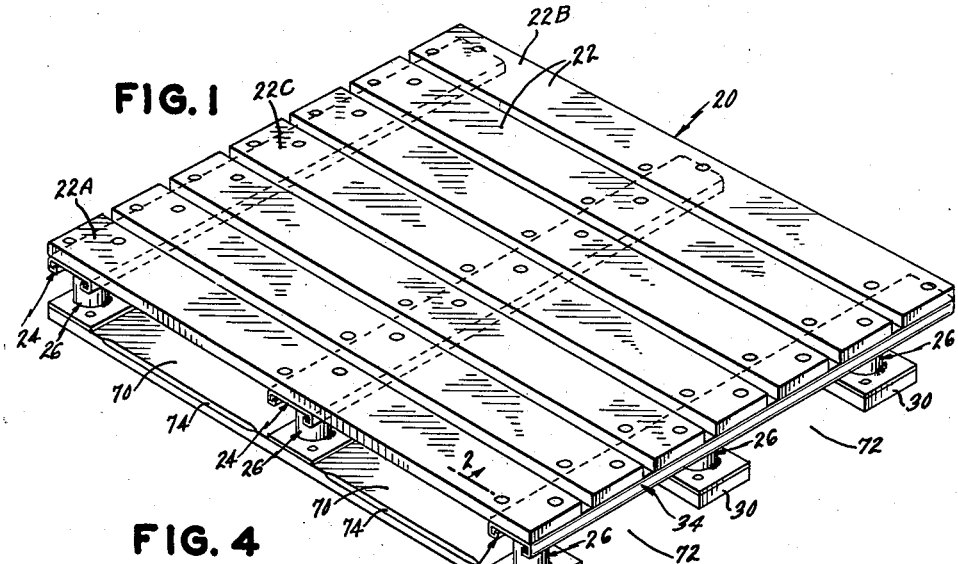
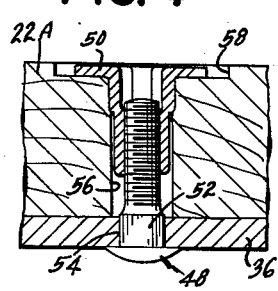
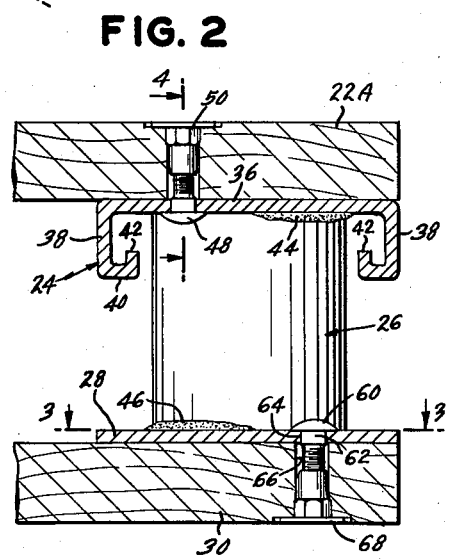
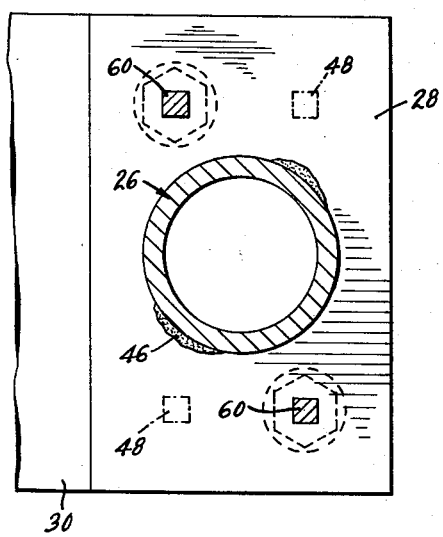

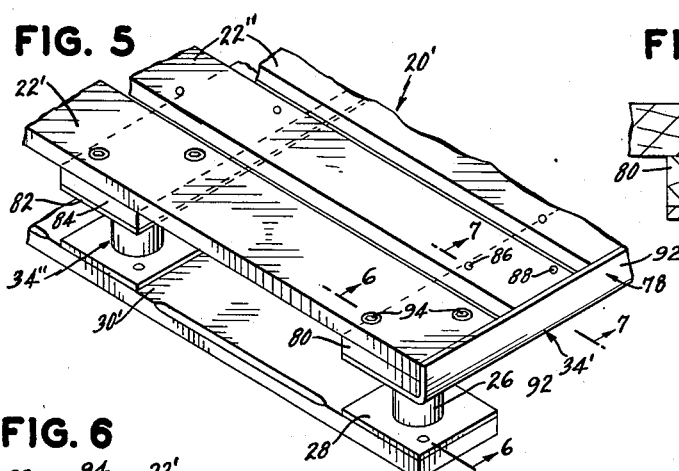
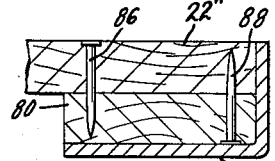
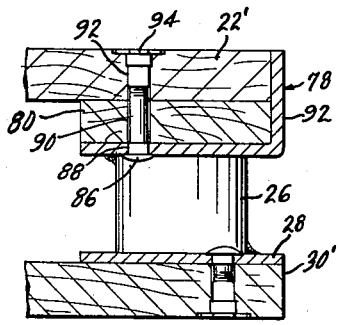
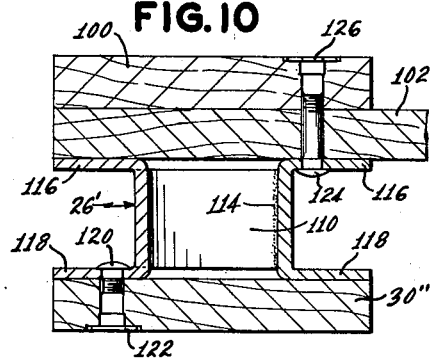
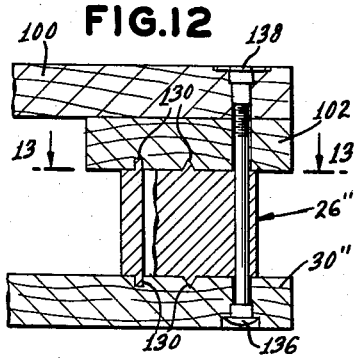
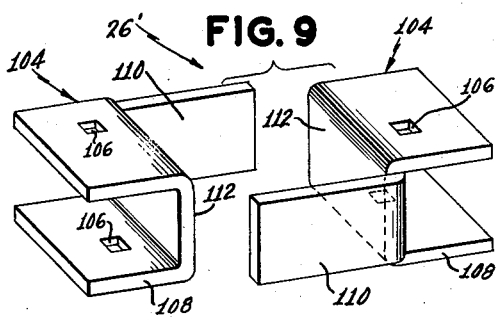
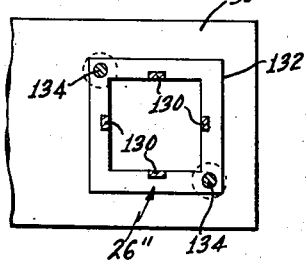
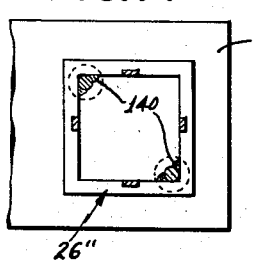

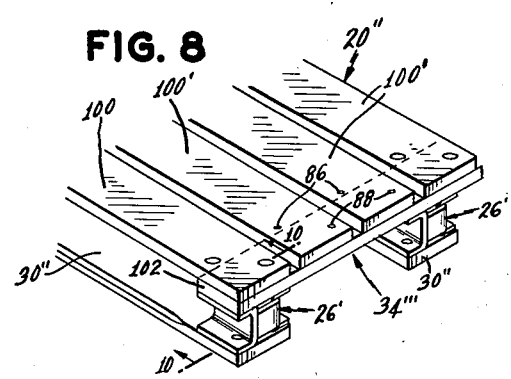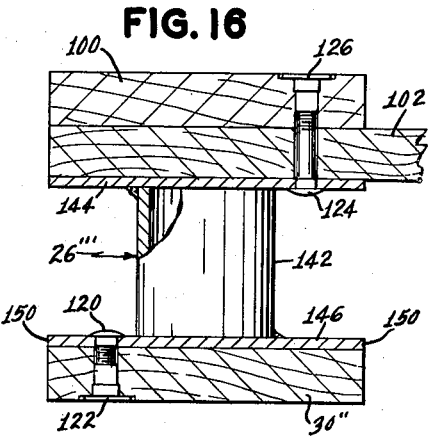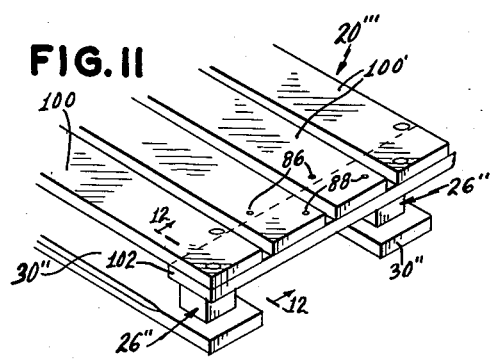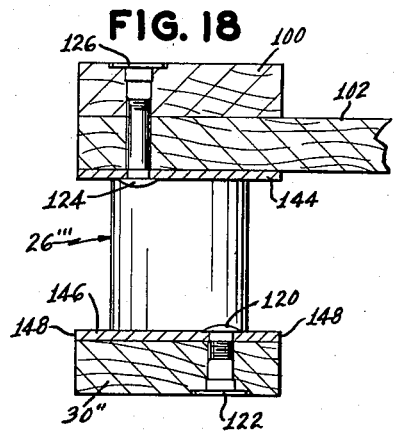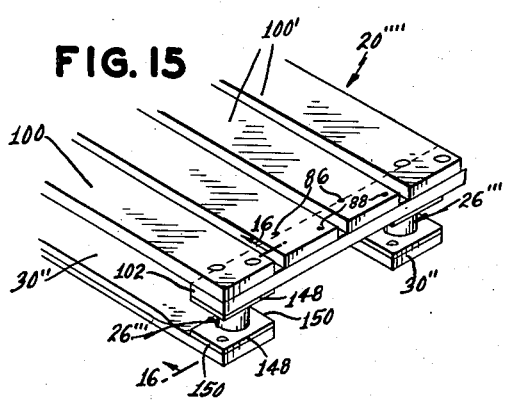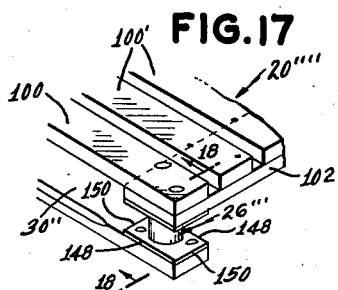

2,922,606
PALLETS

Alfred R. Glassman, Brooklyn, N.Y., and George H. Bensen, Tenafly, N.J., assignors to Acme Pallet Company, Inc., New York, N.Y., a corporation of New York Application December 24, 1956, Serial No. 630,215

6 Claims. (Cl. 248—120)

The present invention relates to pallets for supporting materials for the storage or transportation thereof.

It is an object of the present invention to provide a highly durable pallet which will require a minimum of maintenance or repair. In this connection, it is another object to provide a pallet having blocks or posts that are virtually indestructible.

Another object is the provision of a pallet which can be readily repaired, when required, with a minimum of time, effort, and replacement materials. In this connection, it is another object to provide a pallet having blocks or posts which cannot be split when the deck or stringer boards are secured thereto.

Another object is the provision of a pallet having relatively wide openings for the entry of lift forks or the like.

Another object is the provision of a pallet wherein the bolting of the boards and the stringers to metal posts or the like is greatly facilitated.

Another object is the provision of a pallet which can be shipped or stored in a knocked-down condition and which can be readily assembled by the user, when needed, with a minimum amount of effort and time and without requiring any specialized knowledge or tools.

A further object is the provision of a pallet having a highly novel post assembly which greatly increases the utility and durability thereof and which permits for the maintenance or repair of the pallet with a minimum amount of effort or replacement material.

A still further object is the provision of pallet posts which enable stringer boards of different widths to be assembled to the posts.

The above and other objects, features and advantages of the present invention will be more fully understood from the following description considered in connection with the accompanying illustrative drawing.

In the drawing which illustrates the best modes presently contemplated of carrying out the invention:

Fig. 1 illustrates a pallet pursuant to the present invention;

Fig. 2 is a fragmentary sectional view, on an enlarged scale, taken on the line 2—2 of Fig. 1;

Fig. 3 is a sectional view taken on the line 3—3 of Fig. 2;

Fig. 4 is a fragmentary sectional view, on an enlarged scale, taken on the line 4—4 of Fig. 2;

Fig. 5 is a fragmentary view, similar to Fig. 1 and illustrates a modified form of the pallet;

Fig. 6 is a fragmentary sectional view, on an enlarged scale, taken on the line 6—6 of Fig. 5;

Fig. 7 is a fragmentary sectional view, on an enlarged scale, taken on the line 7—7 of Fig. 5;

Fig. 8 is a fragmentary view similar to Fig. 1 and illustrates another embodiment of the invention;

Fig. 9 is a perspective view of a post utilized in the embodiment of Fig. 8, the post being illustrated in disassembled condition;

Fig. 10 is a sectional view, on an enlarged scale, taken on the line 10—10 of Fig. 8;

Fig. 11 is a view similar to Fig. 8 and illustrates a modified form of the embodiment illustrated in Fig. 8;

Fig. 12 is a sectional view, on an enlarged scale, taken on the line 12—12 of Fig. 11;

Fig. 13 is a fragmentary sectional view, taken on the line 13—13 of Fig. 12;

Fig. 14 is a view similar to Fig. 13 and illustrates a modification in the securement of the post to the pallet;

Fig. 15 is a view similar to Fig. 8 and illustrates another modified form of the embodiment illustrated in Fig. 8;

Fig. 16 is a fragmentary sectional view, on an enlarged scale, illustrated on the line 16—16 of Fig. 15;

Fig. 17 is a view similar to Fig. 15 and illustrates the post of Fig. 15 displaced by 90 degrees; and Fig. 18 is a fragmentary sectional view, on an enlarged scale, taken on the line 18—18 of Fig. 17.

Referring now to Figs. 1 through 4 of the drawings in detail, there is illustrated a pallet 20 pursuant to the presently preferred embodiment of the invention. As here shown, the pallet 20 comprises a plurality of upper deckboards 22 which extend transversely of the stringers 24, a plurality of posts 26 each secured at one end thereof to an associated stringer and secured, at the other end thereof to a plate 28, and a plurality of lower deckboards 30 which are secured to associated plates 28.

A post-stringer assembly 34 is formed by each stringer 24 and its three associated posts 26. More specifically, each stringer 24, as here shown, preferably is formed of metal, such as for example and not by way of limitation, steel, aluminum or other suitable metal. As best shown in Fig. 2, each stringer 24 comprises a web 36 provided with the opposing flanges 38—38 which are laterally inturned, as at 40, and upwardly directed, as at 42.

The posts 26 are tubular members, preferably of circular conformation, and formed preferably of metal, such as for example and not by way of limitation, steel, aluminum or other suitable metal. At the upper end thereof, each post 26 is secured, preferably by welding, as at 44 to the web 36, and at the other end thereof is secured, preferably by welding, as at 46 to a plate 28.

As here shown, the upper deckboards 22 are suitably secured, in transverse relationship, to three stringer-post assemblies 34. More specifically, the boards 22 are formed preferably of wood, and each board is laid across three parallel stringers 24, as illustrated in Fig. 1. As here shown, each board is bolted to each of the three underlying stringers preferably by means of the carriage bolts 48 and the T-nuts 50. The arrangement is such that two angularly related bolts 48 are utilized to secure each board 22 to each stringer 24. More specifically, and as best shown in Fig. 4, each bolt 48 is provided with a rectangular shank portion 52 which is received in a complementary rectangular opening 54 defined in the web 36. The bolt 48 is inserted from the undersurface of the web 36, into a bore 56 provided in the deckboard 22, and each T-nut 50 is countersunk into the recessed opening 58 provided in the upper surface of the deckboard 22, so that the T-nuts 50 are flush with the upper surface of the deckboards. The deckboards are secured in laterally spaced relation transversely of the stringers 24 throughout the longitudinal extent of the latter.

As here shown, the pallet 20 is of the non-reversible type and provision is made for three bottom deckboards 30, each of which interconnects three aligned bottom plates 28 of the stringer post assemblies 34 so as to provide a bottom deckboard underlying each of the end upper deckboards 22A and 22B, and the central upper deckboard 22C. More specifically, and as best shown in Figs. 2 and 3, each plate 28 is bolted to the underlying deckboard 30 by a pair of carriage bolts 60 provided with square shafts 62 which pass through complementary rectangular openings 64 in the plate 28 and into the bores 66 provided in the bottom deckboard 30. Countersunk T-nuts 68 engaged the carriage bolts 60. The paired bolts 60 are angularly related, as best shown in Fig. 3 and they are angularly offset from the associated paired bolts 48.

It will be noted that the pallet 20 is an eight way pallet since the forks of a lift device can enter all four sides of the pallet as well as from the four corners thereof. More specifically, the center post 26 at each side of the pallet 20, defines with the adjacent corner posts 26 the four entry openings 70 between the endmost upper deckboards 22A and 22B and the underlying outer bottom deckboards 30, and the four openings 72 under the end or outer stringers 24. In addition, the forks can enter from each corner of the pallet 20, one fork being inserted in an opening 72 and the other fork being inserted in an adjacent opening 70, the circular configuration of the posts 26 facilitating the entry of the forks from the corners of the pallet. Entry of the forks into the openings 70 is also facilitated by the beveled edges 74 provided on the lower deckboards 30 and entry of the forks into the opening 72 is facilitated by the previously mentioned inturned portions 40 and upturned portions 42 on the flanges 38.

It will be understood that it is within the scope of the present invention to eliminate the portions 42 or to eliminate both the portions 40 and 42 from the flanges 38 of the stringers. It is also within the scope of the present invention to interconnect the depending flanges 38 with a web portion which would oppose the web portion 36 in which case the stringers 24 would be in the form of flattened tubes.

As is well known to those skilled in the art, the stringers in a conventional four way pallet construction are usually the first part of the pallet to break when the pallet is subjected to excess stress. Since, in the present construction, the stringers and posts are not formed of wood but are preferably formed of a suitable metal, if breakage should occur, it would occur at a deckboard. A damaged deckboard is relatively easy to replace since each deckboard is secured, as by the previously described bolts, to the stringers 24 or to the plates 28. Therefore, since the pallet 20 eliminates any chance of breakage to the stringer and since it makes the replacement of the deckboards relatively simple, the desirability and advantages thereof will be readily apparent.

Referring now to Figs. 5, 6 and 7 in detail, there is illustrated a modification of the previously described pallet 20. Pursuant to the present modification there is shown a pallet 20' having two outer stringer post assemblies 34' and an intermediate stringer post assembly 34". The stringer post assemblies 34' and 34" differ from the previously described stringer post assemblies 34, in that they each include both a metal and a wood stringer. More specifically, each stringer of the outer stringer post assemblies is constituted by a right angle member 78 provided with a stringer board 80, and the stringer of the intermediate stringer post assembly is constituted by a flat metallic stringer 82 and a stringer board 84. The stringers 78 and 82 are preferably formed of steel, aluminum or other suitable metal. In the present modification, a much lesser number of bolts is utilized to bolt the upper deckboards to the stringer assemblies. More specifically, each of the two outer deckboards 22' of the upper deck are bolted to the underlying wooden and metallic stringer elements in the manner best illustrated in Fig. 6. As here shown, a carriage bolt 86 extends through a rectangular opening 88 provided in the metallic stringer element 78 and through bores 90 and 92 provided in the stringer board 80 and the overlying deckboard 22', respectively. A T-nut 94 is countersunk in the deckboard 22' and threadedly engaged with each carriage bolt 86. The same arrangement is utilized to secure the central portion of each of the outer deckboards 22' to the intermediate stringer-post assembly 34". The stringer-post assemblies 34' and 34" utilize the posts 26 and plates 28, as in the pallet 20, which plates are similarly secured to the lower deckboards 30' of pallet 20'. However, it will be noted that the intermediate deckboards 22" of the pallet 20' are not bolted to the stringer assemblies as in the pallet 20. In the present modification, the intermediate deckboards 22" are nailed to the underlying stringer boards 80 and 82 in the manner best illustrated in Fig. 7 wherein the nails 86 and 88 are utilized at each of the ends and at the intermediate portion of each of the inner deckboards 22". In all other respects, the pallet 20' is similar to the pallet 20.

It will be understood that in assembling the pallet 20', the intermediate deckboards 22" are nailed to the underlying stringer boards 80 and 82 and then assembled as a unit in the pallet by merely bolting the outer deckboards 22' to the stringer post assemblies as described. It will be noted that the present embodiment is highly advantageous in that the flanges 92 of the angle members 78 overlie the adjacent ends of the upper deckboards so as to protect the upper deckboards at the opposite ends thereof and, in addition, the flange 92 on each of the outer stringer assemblies also serves to strengthen the stringer post assembly. If breakage should occur in the pallet 20', it probably would occur at the outer deckboards 22' which can be readily replaced by merely removing the bolts 86 and removing the damage deckboards 22'. New deckboards may then be readily bolted to the stringers, as described.

It is within the scope of the present invention to eliminate the wooden stringer boards 80 and 84 and bolt the upper deckboards 22' and 22" directly to the outer stringer elements 78 and the intermediate stringer element 82.

Referring now to Figs. 8, 9 and 10 in detail, there is illustrated another embodiment of the present invention pursuant to which wooden stringer members are utilized so that the posts are not permanently secured to a metallic stringer as in each of the pallets 20 and 20'. As here shown, provision is made for a pallet 20" having the outer end upper deckboards 100 and the inner upper deckboard 100' which are secured to three stringer post assemblies 34''', the latter being arranged relative to the upper and lower deckboards in the same manner as previously described in connection with the stringer post assemblies 34. Each stringer post assembly 34''', as here shown comprises a stringer board 102 and three posts 26', as in the prior embodiments wherein each stringer is associated with three posts. As best shown in Fig. 9, each post 26' is formed from a pair of T-shaped metallic members or stampings of suitable gage sheet material, and the stampings 104 are each provided with the rectangular holes 106. The flat stampings are bent into the form shown in Fig. 9 to provide a generally U-shaped portion 108 provided with the lateral extension 110 from one end of the bight 112 thereof. The free end of each extension 110 is suitably secured, as by welding at 114 to the free end of the bight 112 of the other stamping 104, as best illustrated in Fig. 10. The resultant post has a hollow rectangular center and a pair of laterally extending upper flanges 116—116 and a pair of laterally extending lower flanges 118—118. The three bottom deckboards 30" are secured to three posts 26' by means of the carriage bolts 120 and the countersunk T-nuts 122. It will be understood that a carriage bolt 120 is inserted through each of the square openings 106 provided in each lower flange 118, it being noted that each lower flange opening is offset from the associated upper flange opening. The two outer upper deckboards 100 as well as the intermediate upper deckboards 100' are each secured at each end thereof, and intermediately thereof, by being bolted to the underlying posts 26' through the intervening stringer 102. More specifically, and as best shown in Fig. 10, each upper flange 116 of each post 26′ is secured both to a stringer 102 and to an upper deckboard as by a carriage bolt 124 and a countersunk T-nut 126, the deckboard and stringer being bored to accommodate the bolt and the nut. The intermediate deckboards 100′ of the upper deck, between the two outer and the center deckboard, are each secured at the opposite ends and at the intermediate portions thereof to the underlying wooden stringers 102, as by the nails 86 and 88 as previously described in connection with Fig. 7.

The pallet 20″ has the advantage over the pallets 20 and 20′ in that the amount of welding associated with the pallets 20 and 20′ wherein the posts are welded at both their opposite ends to the metallic stringer members and to the metallic plates, is greatly reduced since, in the present embodiment, the sole welding required is in the formation of the post, as at 114, and it is to be noted that the posts 26′ are secured by being bolted to the lower deckboards and to the stringers and upper deckboard, as shown in Fig. 10.

Referring now to Figs. 11 through 14, there is illustrated a pallet 20‴ which is a modification of the embodiment illustrated in Figs. 8 through 10. In the present form of the invention, wooden stringers 102 are utilized, as in the pallet 20″, the chief difference in the pallet 20‴ being in the formation of the posts. As here shown, provision is made for the posts 26‴ which may be formed of sections of hollow tubing, the sections being shown in the present embodiment as square or rectangular it being understood however that circular elliptical or other hollow sections may be used. As here shown, the hollow rectangular posts 26″ are provided with prongs 130 at the opposite ends thereof, as best illustrated in Fig. 12, which prongs are forced into the bottom deckboard 30″ and into the upper wooden stringers 102. In order to assemble the posts 26″ with the stringer 102, the upper deckboard 100 and the lower deckboard 30″, the wall 132 of the post is bored, as at 134, in diagonally opposite corners thereof, and a bolt 136 is inserted through aligned bores in the lower deckboard 30″, as well as in the stringer 102 and the upper deckboard 100, as best illustrated in Fig. 12. It will be noted that the threaded bolt 136 is countersunk in the lower deckboard 30″ and that a T-nut 138 is countersunk in the upper deckboard 100 for threaded engagement with each bolt 136. The remaining upper deckboards 100′ are nailed, as at 86 and 88, as previously described to the stringer boards 102.

In the modification illustrated in Fig. 14, the bolts 136, in lieu of being inserted through bores provided in the wall 132 of the post 26″, are welded against the diagonally opposing inner corners of the post, as indicated at 140. It will be understood that it is within the scope of the present inveniton to omit the welding 140, and to have the bolts 136 retained or positioned relative to the post 26″ by a snug fit thereof in the opposing corners. It will also be understood that it is within the scope of the present invention to omit the prongs 136 provided on the post 26″.

Referring now to Figs. 15 through 18, there is illustrated another modification wherein individual posts are secured to a wooden stringer 102. More specifically, as herein shown, provision is made for a pallet 20″″ provided with the post assemblies 26‴. Each post assembly 26‴ is constituted by a hollow tubular metallic section 142 which is welded at the opposite ends thereof to the rectangular metallic plates 144 and 146, respectively. The lower plate 146 is secured to the underlying lower deck member 30″ by a carriage bolt 120 and a T-nut 122, as previously described in connection with Fig. 10, and the upper plate 144 is secured to the stringer 102 and an upper deckboard 100 by the carriage bolt 124 and the T-nut 126, in the same manner illustrated and described in connection with said Fig. 10. As previously indicated, the upper and lower plates 144 and 146 are of rectangular configuration so that the sides 148—148 thereof are longer than the ends 150—150 thereof. It will be noted that the arrangement of the plates in Figs. 15 and 17 differs in that the longer sides 148 of the plates in Fig. 17 are reversed by 90 degrees from the position shown thereof in Fig. 15 so that when disposed as in Fig. 17, the post 26‴ can accommodate wider stringers 102 than can be accommodated by the post when disposed as in Fig. 15. In all other respects, the construction shown in Figs. 15 and 17 is the same. Consequently, it will be apparent that the posts 26‴ can accommodate stringers 102 of different widths, depending upon the orientation of the posts.

While the various posts described above have been indicated as being formed of a suitable metal, preferably steel or aluminum, it will be understood that it is within the scope of the present invention to form posts of other materials, such as for example and not by way of limitation, plastic or nylon. Similarly, while the various upper and lower deckboards have been indicated as being formed of wood, it will also be understood that it is within the scope of the present invention to form the deckboards of other material such as, for example and not by way of limitation, plastic or a suitable metal. Those intermediate deckboards, which are fastened to the stringers at the spans of the latter between associated posts, have been illustrated and described as being secured to said spans by nails, as for example in Fig. 7. However, it will be understood that it is within the scope of the present invention to otherwise secure said deckboards to the stringers, for example and not by way of limitation, by clinched nailing, by drive screw nails, by screws, eyelets, rivets, or other suitable fastening means. Furthermore, while the various pallets herein have been illustrated and described as being of the non-reversible type, it will be understood that it is within the scope of the present invention to provide reversible pallets.

While the upper and lower decks of the various pallets illustrated and described herein are each constituted by a plurality of laterally separated deckboards, it will be understood that it is within the scope of the present invention to have either the upper or lower deck of the pallet, or both decks thereof, constituted by a single section of a suitable sheet material. For example, or not by way of limitation, a single sheet of plywood, composition material, plastic, metal or other suitable material can be used as a deckboard, or individual boards can be integrated, as by tongue and groove connections, into a continuous deckboard having no intermediate spaces. Where a continuous or single sheet deckboard is used, it is within the scope of the present invention to omit stringers for said deckboard and to bolt or otherwise secure the continuous deckboard directly to the posts.

While we have shown and described the preferred embodiments of our invention, it will be understood that various changes may be made in the idea or principles of the invention within the scope of the appended claims.

Having thus described our invention, what we claim and desire to secure by Letters Patent is:

1. A pallet comprising a first and a second plurality of deckboards in spaced apart relation, a plurality of stringers to which the deckboards of said first plurality are directly secured, a plurality of tubular posts directly and fixedly secured to said stringers and extending between said stringers and said second plurality of deckboards to maintain said pluralities of deckboards in said spaced apart relation, each of said posts having one end thereof in abutment with the associated stringer, and means separably fastening said posts directly to said second plurality of deckboards.

2. A pallet comprising a first and a second plurality of deckboards in spaced apart relation, a plurality of stringers to which the deckboards of said first plurality are directly secured, a plurality of tubular posts directly and fixedly secured to said stringers and extending between said stringers and said second plurality of deckboards to maintain said pluralities of deckboards in said spaced apart relation, each of said posts having one end thereof in abutment with the associated stringer, and means separably fastening said deckposts directly to said second plurality of deckboards, said fastener means comprising separable fastener devices which are removable from said posts and said second plurality of deckboards.

3. A pallet comprising a first and a second plurality of deckboards in spaced apart relation, a plurality of stringer-post assemblies extending between said deckboards in secured relation thereto to maintain said pluralities of deckboards in said spaced apart relation, and said stringer-post assemblies each comprising a stringer secured directly to one of said pluralities of deckboards and a plurality of metal posts directly and fixedly secured to the stringer, said stringer being a channel shaped member, and separable fastener devices securing each stringer to the deckboards of said one plurality of deckboards, each of said posts having one end thereof in abutment with the stringer to which it is secured.

4. A pallet comprising a first and a second plurality of deckboards in spaced apart relation, a plurality of stringer-post assemblies extending between said deckboards in secured relation thereto to maintain said pluralities of deckboards in spaced apart relation, and said stringer-post assemblies each comprising a stringer secured to one of said pluralities of deckboards and a plurality of metal posts directly and fixedly secured to the stringer, and said posts each being separably secured directly to a deckboard of said other plurality of deckboards, said stringers being bolted to the deckboards of said first plurality of deckboards, and said posts being bolted to the associated deckboards of said second plurality of deckboards, said posts having one end in abutment with said stringers.

5. A pallet, comprising deck-forming means, and means for supporting the pallet deck spaced above a surface for access of lift forks under the deck, said supporting means comprising a plurality of laterally spaced metal stringers and a plurality of companion metal posts spaced from each other and having one end in abutment and fixedly secured to each stringer in position therebelow, and means removably securing said deck-forming means directly to said stringers, said securing means comprising a plurality of sets of companion separable fastener devices engageable with said deck-forming means and each of said stringers, respectively.

6. A pallet comprising a first and a second plurality of deckboards in spaced apart relation, a plurality of stringer-post assemblies extending between said deckboards in secured relation thereto to maintain said pluralities of deckboards in said spaced apart relation, and said stringer-post assemblies each comprising a stringer secured directly to one of said pluralities of deckboards and a plurality of spaced metal posts having one end in abutment and fixedly secured to the stringer, said stringer being a channel shaped member, separable fastener devices securing each stringer to the deckboards of said one plurality of deckboards, and other separable fastener devices securing each of said posts individually to a deckboard of the other plurality of deckboards.

References Cited in the file of this patent

UNITED STATES PATENTS

| | | |
|---|---|---|
| 2,503,022 | Benoist et al. | Apr. 4, 1950 |
| 2,542,129 | Fletcher | Feb. 20, 1951 |
| 2,597,411 | Vankrimpen | May 20, 1952 |
| 2,692,107 | Ridder | Oct. 19, 1954 |
| 2,783,960 | Hertz et al. | Mar. 5, 1957 |

FOREIGN PATENTS

| | | |
|---|---|---|
| 709,051 | Great Britain | May 12, 1954 |